United States Patent
Burch et al.

(10) Patent No.: US 7,207,897 B2
(45) Date of Patent: Apr. 24, 2007

(54) GOLF CLUB HEAD AND SHAFT CONNECTOR AND METHOD

(76) Inventors: Eric Burch, 304 S. Chicago Ave., Rockford, IL (US) 61104; Michael Tolmie, 4029 Oak Seed Trail, Roscoe, IL (US) 61073

( * ) Notice: Subject to any disclaimer, the term of this patent is extended or adjusted under 35 U.S.C. 154(b) by 0 days.

(21) Appl. No.: 11/051,675

(22) Filed: Feb. 4, 2005

(65) Prior Publication Data

US 2005/0176521 A1    Aug. 11, 2005

Related U.S. Application Data

(60) Provisional application No. 60/542,057, filed on Feb. 5, 2004.

(51) Int. Cl.
*A63B 53/02* (2006.01)

(52) U.S. Cl. .................. 473/288; 473/306; 473/307

(58) Field of Classification Search ........ 473/306–307, 473/298–299, 288, 296, 239; 403/299, 306, 403/342
See application file for complete search history.

(56) References Cited

U.S. PATENT DOCUMENTS

| | | |
|---|---|---|
| 477,487 A | 6/1892 | Ball |
| 477,955 A | 6/1892 | Patterson |
| 478,140 A | 7/1892 | Sperry |
| 478,233 A | 7/1892 | Hewitt |
| 478,951 A | 7/1892 | Cassteel |
| 482,087 A | 9/1892 | Henderson |
| 482,089 A | 9/1892 | Jackson |
| 482,090 A | 9/1892 | Kehr |
| 482,094 A | 9/1892 | Michener |
| 482,419 A | 9/1892 | Willford |
| 482,420 A | 9/1892 | Compton |
| 483,826 A | 10/1892 | Brüngger |
| 1,565,069 A * | 12/1925 | Edwards ............... 473/298 |
| 2,464,850 A * | 3/1949 | Crawshaw ............ 473/299 |
| 5,390,921 A * | 2/1995 | De Ruyter ............ 473/299 |
| D477,487 S | 7/2003 | Chaney et al. |

(Continued)

FOREIGN PATENT DOCUMENTS

WO    WO 2004/000424    12/2003

(Continued)

OTHER PUBLICATIONS

2004 PGA Merchandise Show News (magazine); Jan. 31, 2004; Cover and pp. 40-41; Publisher: GGRW Inc., Norwalk, CT.

*Primary Examiner*—Stephen Blau
(74) *Attorney, Agent, or Firm*—Reinhart Boerner Van Deuren P.C.

(57) ABSTRACT

A connector used to assemble a golf club. The connector includes a shaft mount having bore and a first connector and a head mount having a shaft and a second connector. The bore is sized to mate with and secure the golf club shaft while the shaft is sized to mate with and secure the golf club head. First threads, formed on the first interchangeable connector, and second threads, formed on the second interchangeable connector, are of a common or universal size. The first threads on the first interchangeable connector and the second threads on the second interchangeable are threadably mateable to connect the shaft mount and the head mount together even though the bore and the shaft may each be one of a plurality of different sizes.

13 Claims, 9 Drawing Sheets

U.S. PATENT DOCUMENTS

| | | |
|---|---|---|
| D477,955 S | 8/2003 | Chaney et al. |
| D478,140 S | 8/2003 | Burrows |
| D478,233 S | 8/2003 | Chaney et al. |
| D478,951 S | 8/2003 | Burrows |
| D482,087 S | 11/2003 | Burrows |
| D482,089 S | 11/2003 | Burrows |
| D482,090 S | 11/2003 | Burrows |
| D482,094 S | 11/2003 | Burrows |
| D482,419 S | 11/2003 | Burrows |
| D482,420 S | 11/2003 | Burrows |
| D483,826 S | 12/2003 | Burrows |
| D484,208 S | 12/2003 | Burrows |
| 2003/0050132 A1* | 3/2003 | Wilbur ....................... 473/296 |
| 2003/0181255 A1* | 9/2003 | Ho .............................. 473/316 |
| 2004/0018886 A1 | 1/2004 | Burrows |
| 2004/0018887 A1 | 1/2004 | Burrows |

FOREIGN PATENT DOCUMENTS

| | | |
|---|---|---|
| WO | WO 2004/000425 | 12/2003 |
| WO | WO 2004/009181 | 1/2004 |
| WO | WO 2004/009186 | 1/2004 |

* cited by examiner

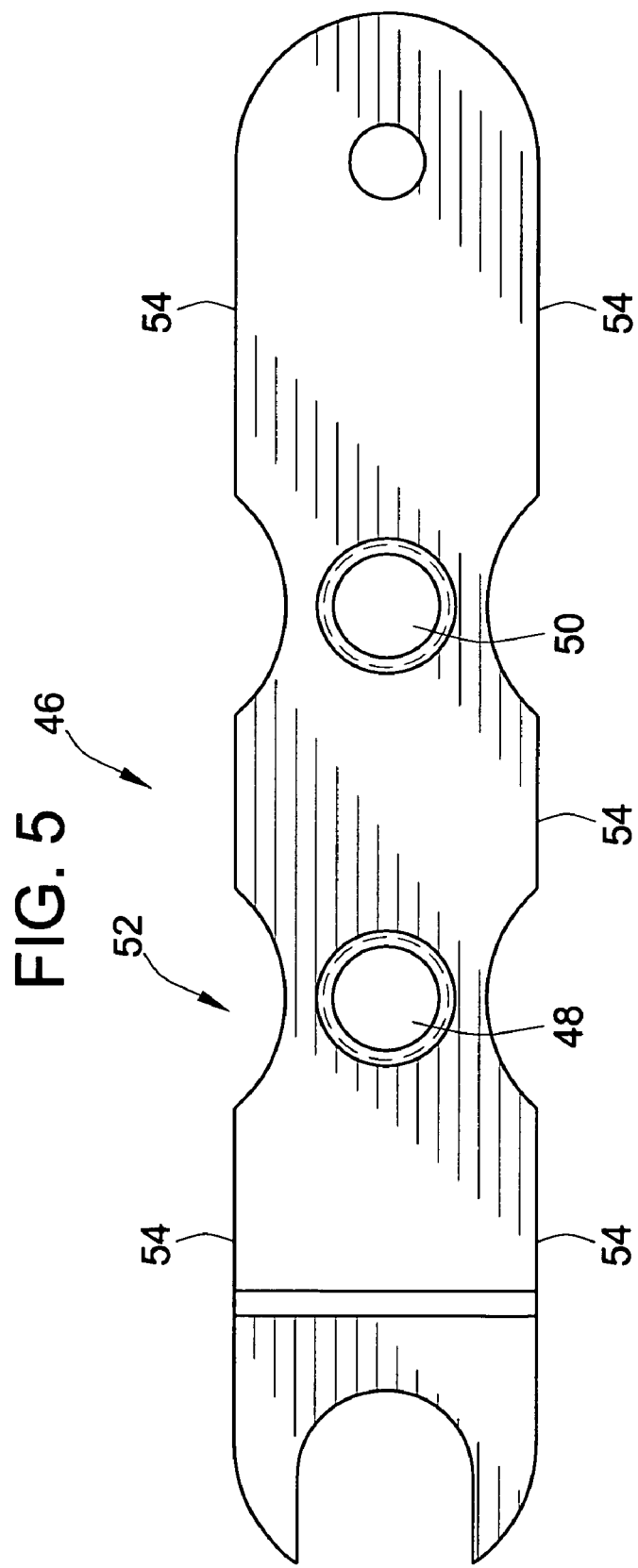

GOLF CLUB HEAD AND SHAFT CONNECTOR AND METHOD

CROSS-REFERENCE TO RELATED PATENT APPLICATIONS

This patent application claims the benefit of U.S. Provisional Patent Application No. 60/542,057, filed Feb. 5, 2004.

FIELD OF THE INVENTION

The present invention generally relates to golf club parts, and more particularly relates to connectors between golf club shafts and golf club heads, and methods for assembling golf clubs.

BACKGROUND OF THE INVENTION

The typical way to connect a golf club shaft and a golf club head is to epoxy the tip end of the golf club shaft into a bore formed into the body of the golf club head. Often times, specialty golf shops will assembly the shafts and the golf club heads to customize the clubs for a customer. In selecting club heads and shafts, it is often desirable to try the selected combination prior to purchase. There is also known forms of shaft and head component connections such as that shown in PCT Patent Application No. WO 2004/009186 and U.S. Published Application Nos. 2004/0018887 and 2004/0018886. As will be readily appreciated by those skilled in the art once the present invention is understood, there are significant deficiencies existing in the prior art.

BRIEF SUMMARY OF THE INVENTION

The present invention provides a connector that is used to connect a golf club shaft with a golf club head. The connector includes a first part which mounts to the golf club shaft and a second part which mounts to the golf club head. These two parts can be connected in order to secure the golf club shaft to the golf club head and then released if desired to allow interchangeability. It is a significant advantage of the present invention that the connector of the present invention provides a golf club shop to develop its own professional fitting system and allows these shops to create as many different shaft and club head combinations as may be desired. A further advantage is the present invention allows for combinations of shafts and heads of different shaft component and head components manufacturers.

Other aspects, objectives and advantages of the invention will become more apparent from the following detailed description when taken in conjunction with the accompanying drawings.

BRIEF DESCRIPTION OF THE DRAWINGS

FIG. 5 is a top plan view of a tool used to assemble the connector and golf club of FIGS. 1 and 2.

Figure 1:
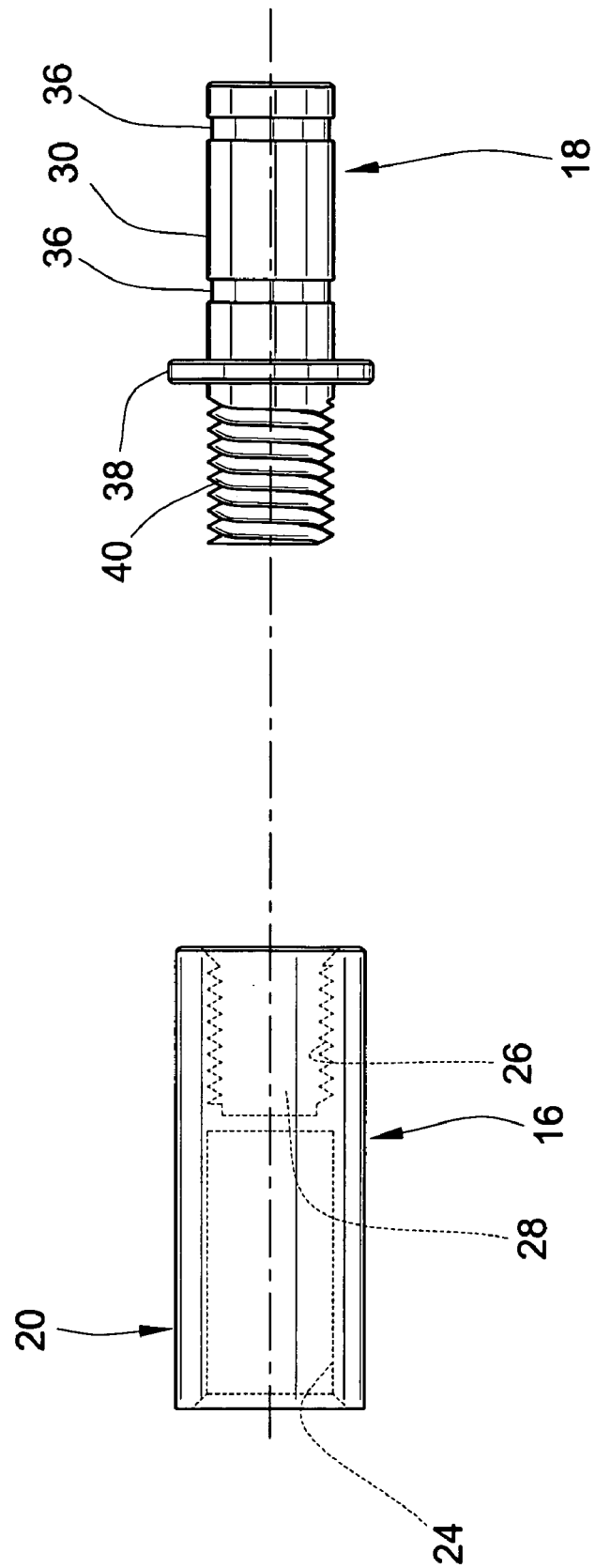
FIG. 1 is an exploded side view of a connector for use in connecting a golf club shaft with a golf club head in accordance with a preferred embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the figures, an embodiment of the present invention has been shown as a connector 10 that is used to removably mount a golf club head 12 to a golf club shaft 14. The connector 10 includes a shaft mount 16 and a head mount 18 that interconnect and mate with one another.

The shaft mount 16 includes a sleeve portion 20 that is slidably received onto the tip end 22 of the golf club shaft 14. The sleeve portion 20 includes a cylindrical bore 24 sized to be closely received upon the shaft tip end 22. As illustrated in FIG. 2A, the cylindrical bore 24 can be tapered proximate the bottom to better facilitate insertion of the tip end 22 of the golf club shaft 14 as well as provide a reservoir for epoxy. The shaft mount 16 also includes an interchangeable connector that mates with the head mount 18, which is shown in the form of a threaded bore 26 which is concentric with the bore 24. A seating flange 28 is provided for engaging the tip end 22 of the golf club shaft 14 to provide for proper location of the shaft mount 16 with the golf club shaft 14 for dry fitting and/or for epoxying operations.

The head mount 18 includes a cylindrical stub shaft 30 that is sized to be slidably received into the cylindrical bore 32 which is typically formed into the golf club head 12. Typically this cylindrical bore 32 will be provided in a projecting sleeve portion 34 that is unitarily formed with the golf club head 12 as a single cast or machined component. The stub shaft 30 may include one or more epoxy receiving grooves 36 for the receipt of epoxy material that is used to bond and secure the stub shaft 30 to the golf club head 12. The grooves 36 thus provide a receptacle for epoxy material to ensure better and proper securement between the head mount 18 and the golf club head 12.

The grooves 36 can be formed on stub shaft 30 in a variety of patterns such as, for example, grooves in concentric circles (FIG. 2), a spiral or corkscrew groove (FIG. 2B), axially aligned grooves, and the like. If the spiral or corkscrew pattern of FIG. 2B is employed for grooves 36, it is preferable that the swirl run in the same direction as the threading on threaded bore 26 and threaded shaft 40. The varying patterns of the grooves 36 can be chosen based on differing construction objectives for the assembled golf club 44 such as, for example, removing undesirable weight, permitting an increase amount of epoxy, granting the epoxy better coverage, and more securely holding the club head 12.

If desired, all or a portion of stub shaft 30 can be abraded to further promote securement between the head mount 18 and the golf club head 12.

The head mount 18 also includes a stop flange 38, which is positioned to be seated against the projecting sleeve portion 34 from the golf club head 12, that serves to properly locate the head mount 18 relative to the golf club head 12 for dry fitting and/or for epoxying operations.

The head mount 18 further comprises an interchangeable connector that mates or interconnects with the shaft mount 16, which is shown in the form of a threaded shaft 40 that is coaxial or concentric with the stub shaft 30. The threaded shaft 40 projects in an opposite direction from the stop flange 38 and threadingly mates with the threaded bore 26 of the shaft mount 16.

As shown by the figures, when threaded bore 26 and threaded shaft 40 are threadably mated, the two components alone prevent and/or prohibit both rotation of and axial displacement of the golf club head 12 relative to the golf club shaft 14. To augment this result, for right-handed golfers or right-handed golf clubs, the threading on the threaded bore 26 and the threaded shaft 40 are left-hand threading such that during use of an assembled golf club swinging the golf club and hitting the ball tends to tighten the threaded connection rather than loosening it. Likewise, for left-handed golfers and left-handed golf clubs, the threading would be right-hand threads rather than left-hand threads.

There are many different golf club component manufacturers that manufacture the shaft and that manufacture the head (including wood type heads and iron type heads). Many of the manufacturers have developed standard diameter sizes for the tip end 22 of the shaft and the cylindrical bore 32 of the golf club head 12. In particular, the standard used by many in the industry is 0.335 inch diameter for woods and 0.370 inch for irons. Therefore, the diameter of the bore 24 and the stub shaft 30 of the connector 10 are sized to closely and slidably fit with these diameters. However, it will be readily appreciated that there is a significant number of manufacturers that do not conform to standards and have sizes that deviate from 0.335 inch for woods and 0.370 inch for irons. This is a great source of headaches when attempting to make customized products using a head of one manufacturer with a shaft of another manufacturer. Accordingly, the present invention also may entail a kit in which different diameter sizes are provided for the cylindrical bore 24 and the stub shaft 30 for each different part of the connector 10 to accommodate the deviators in the industry. However, because the threading and diameter of the threads for the threaded bore 26 and the threaded shaft 40 remain constant even if the sizes of the stub shaft 30 and the cylindrical bore 24 are changed, it is now possible to interconnect golf club components of different manufacturers regardless of whether the shaft and the golf club head have corresponding diameters and are capable of fitting with one another absent the connector of the present invention.

The kit can also include a tool 46, such as the wrench depicted in FIG. 5, for aligning the golf club shaft relative to the golf club head. In addition the standard features and functions that a typical tool might have, tool 46 includes right-hand hole 48, left-hand-hole 50, cut-outs 52, and edges 54. Right-hand hole 48 and left-hand hole 50 are each threaded apertures, however, the threading of right-hand hole 48 and left-hand hole 50 progress in opposite directions.

Figure 6A:
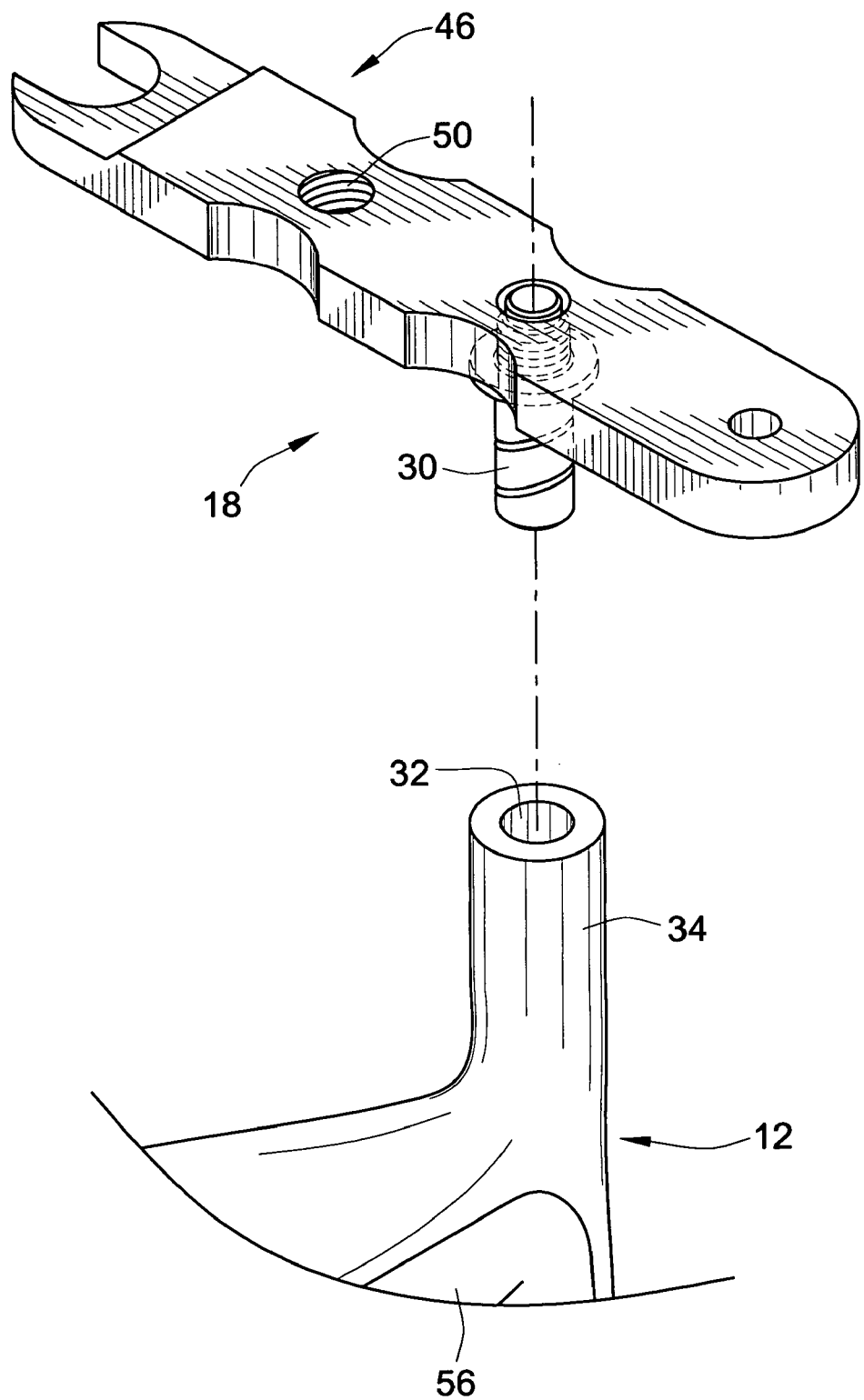
FIGS. 6A–6C are perspective views of the connector and a portion of the golf club of FIGS. 1 and 2 and tool of FIG. 5 illustrating steps for aligning the golf club during assembly.
Figure 6B:
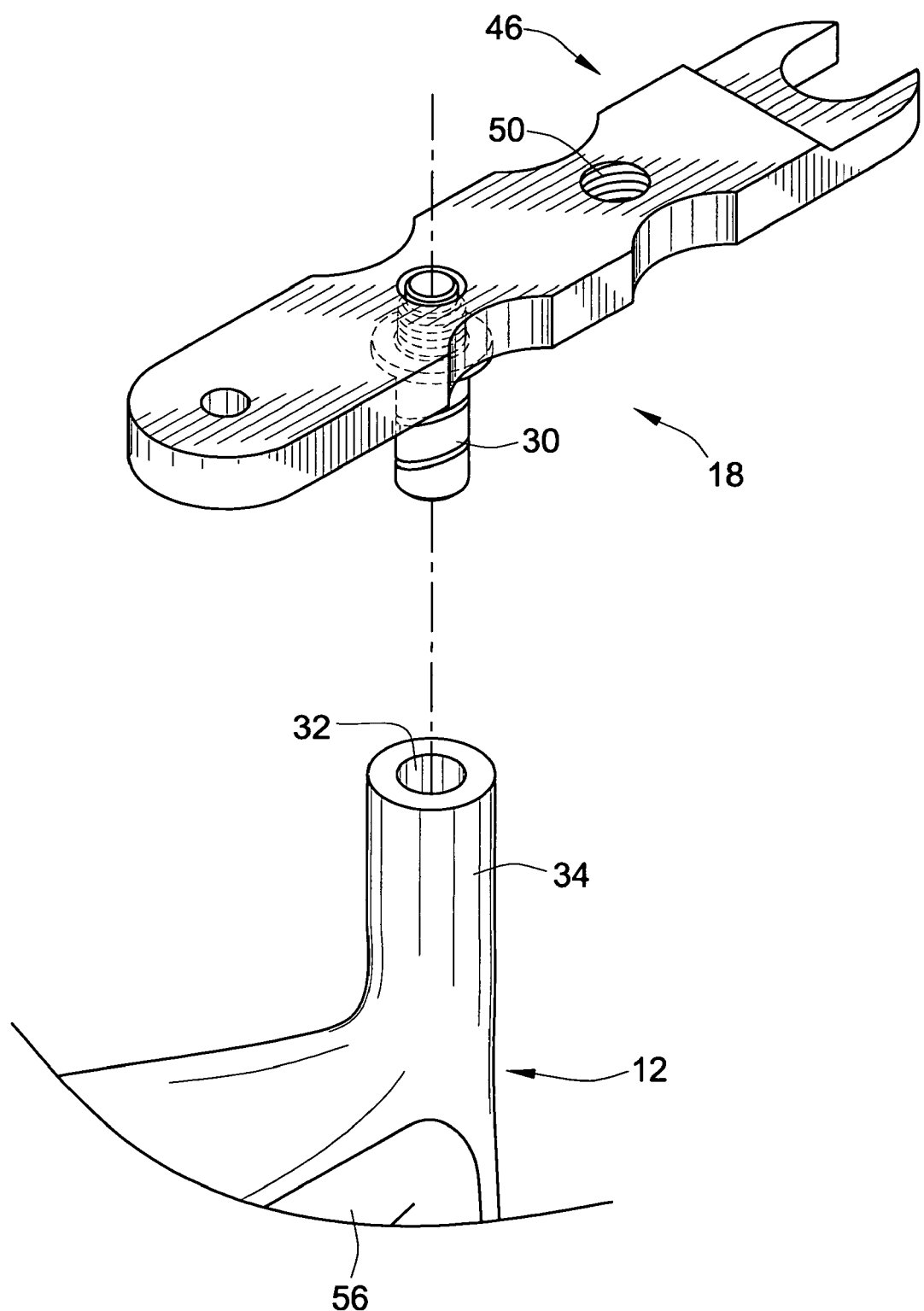
Figure 6C:
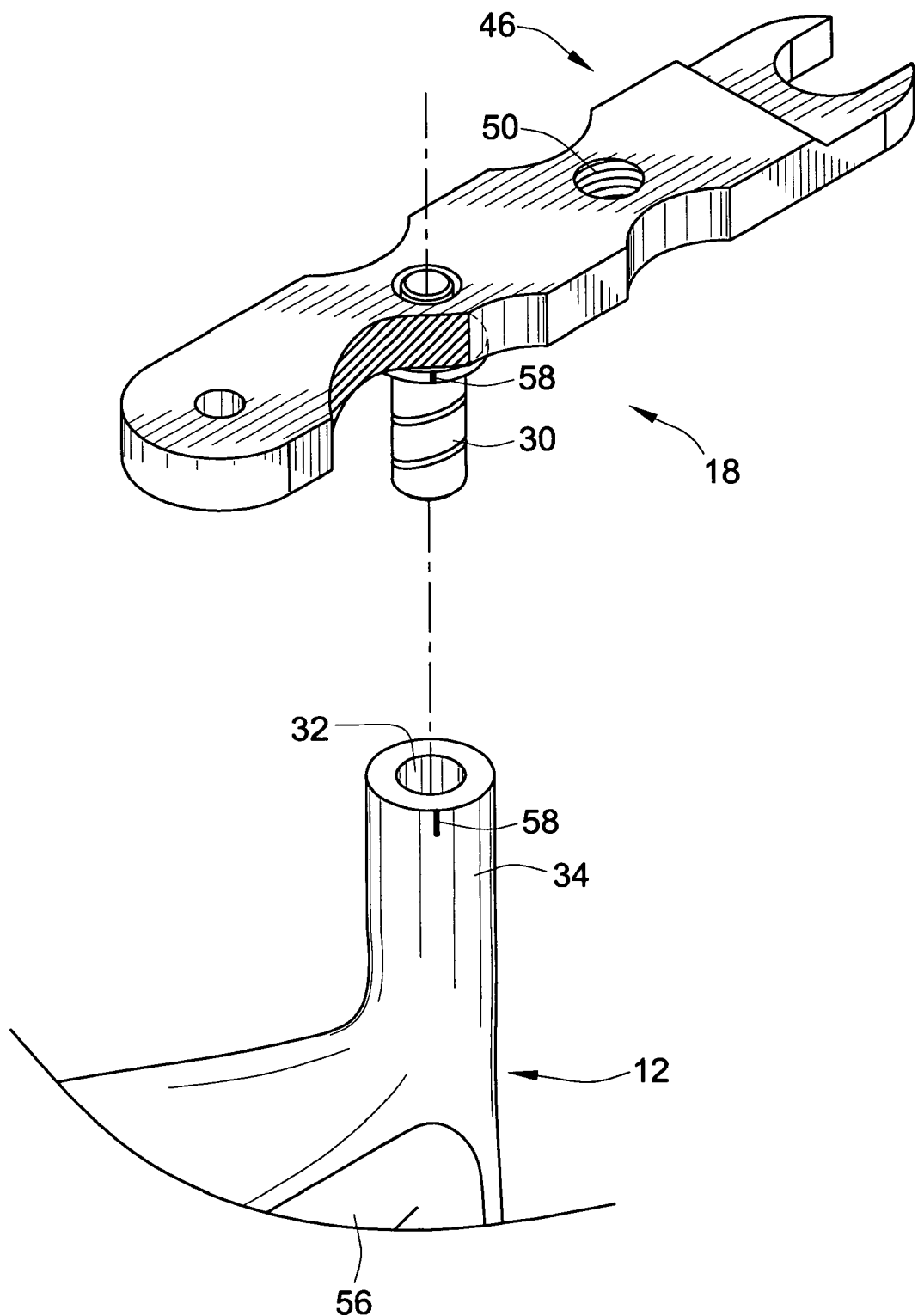

In use, tool 46 permits the alignment of the golf club components, such as the head mount 18, the golf club head 12, the shaft mount 16, and the golf club shaft 14, with each other. A series of alignment steps, as shown in FIGS. 6A, 6B, and 6C, is illustrative of the alignment process and functionality of tool 46. If, for example, a golf club assembler desires to construct or fabricate a right-handed golf club, the golf club assembler begins by threadably inserting threaded shaft 40 of stub shaft 30 into right-hand hole 48 as shown in FIG. 6A. Thereafter, the stub shaft 30 of combined tool 46 and head mount 18 are slidably inserted into cylindrical bore 32 of golf club head 12 and the tool is oriented such that edges 54 are in parallel with golf club face 56 as shown in FIG. 6B. After edges 54 and golf club face 56 have been aligned, a mark 58 or other indicia is inscribed upon head mount 18 and golf club head 12 as depicted in FIG. 6C. Notably, since cut-outs 52 have been removed from tool 46, a marker or other instrument can more easily be brought in close proximity to the head mount 18 or the golf club head 12.

Next, with marks 58 having been placed, the stub shaft 30 of combined tool 46 and head mount 18 and are slidably extracted from cylindrical bore 32 of golf club head 12 and the tool 46 is threadably separated from threaded shaft 40. Continuing, an epoxy is applied to stub shaft 30, the stub shaft is slidably inserted back into cylindrical bore 32 of golf club head 12, and the marks 58 on head mount 18 and golf club head 12 are aligned with respect to each other. When the epoxy has dried and the head mount 18 is securely held within golf club head 12, shaft mount 16 and golf club shaft 14 can also be attached to form assembled golf club 44 that is desirably aligned.

In one embodiment, employing the alignment procedure, the tool 46 assists a golf club assembler by determining a threading initiation point when aligning the threaded bore 26 relative to the threaded shaft 40. Knowing and employing the initiation point ensures that the golf club shaft 14 and the golf club head 12 are aligned and congruent when the golf club 44 is assembled. In another embodiment, the tool 46 assists a golf club assembler in aligning the golf club shaft 14 and the golf club head 12.

An alignment procedure similar to that of the head mount 18 and golf club head 12 can be employed for the shaft mount 16 and shaft 14. Such a procedure might be necessary, for example, if a golf club shaft 14 that is non-circular in cross section (e.g., a putter) is used to formulate assembled golf club 44.

Figure 2:
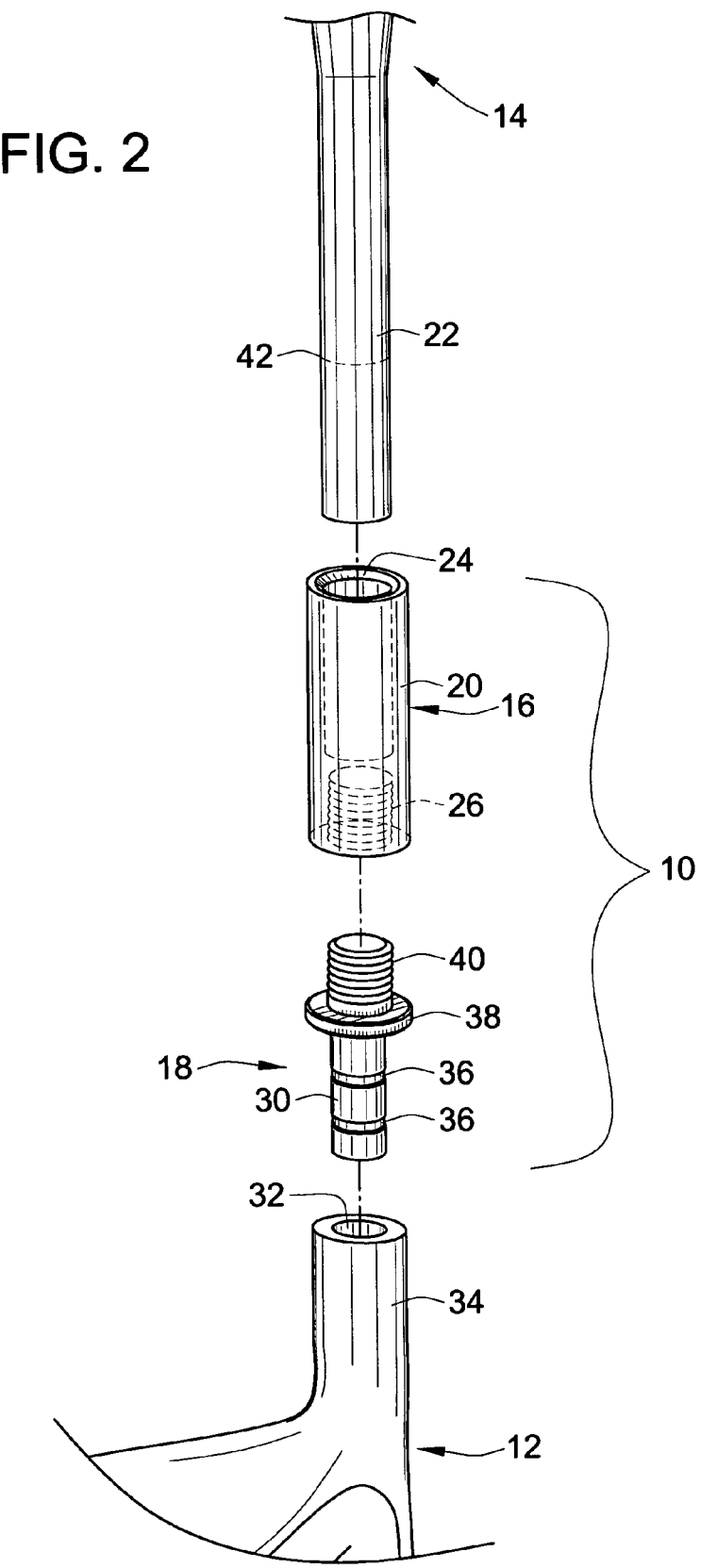
FIG. 2 is an exploded perspective view of the connector shown in FIG. 1, that is shown in association with a golf club shaft and a golf club head in accordance with an embodiment of the present invention.
Figure 2A:
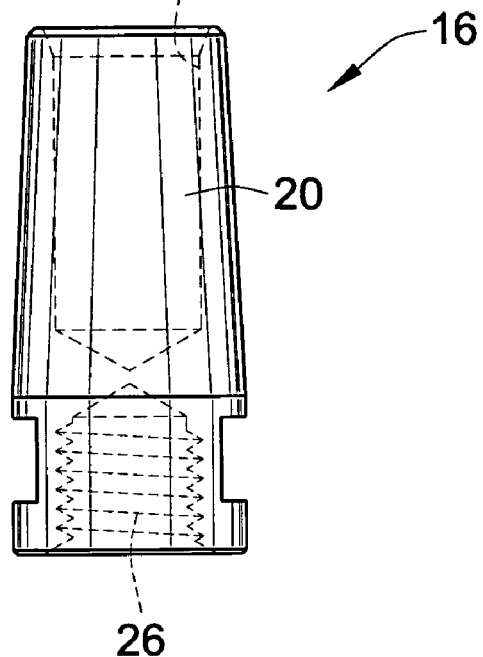
FIG. 2A is side elevation view of one embodiment of a shaft mount for the connector of FIG. 1.
Figure 2B:
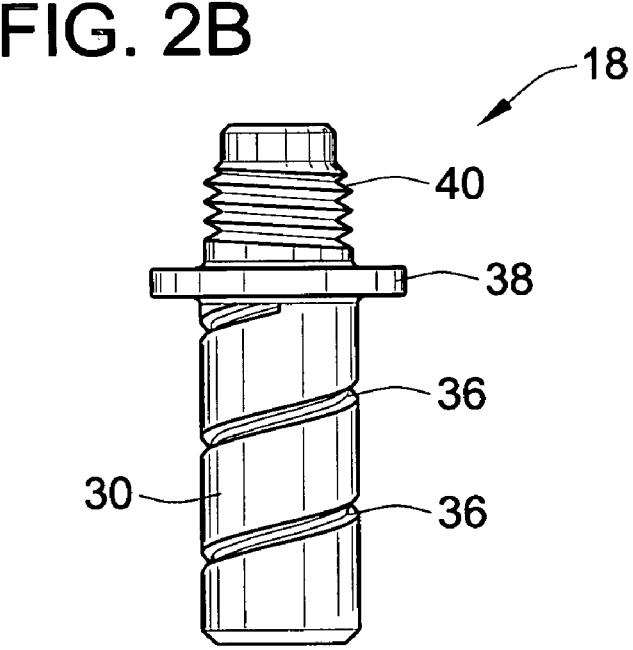
FIG. 2B is side elevation view of one embodiment of a head mount for the connector of FIG. 1.
Figure 3:
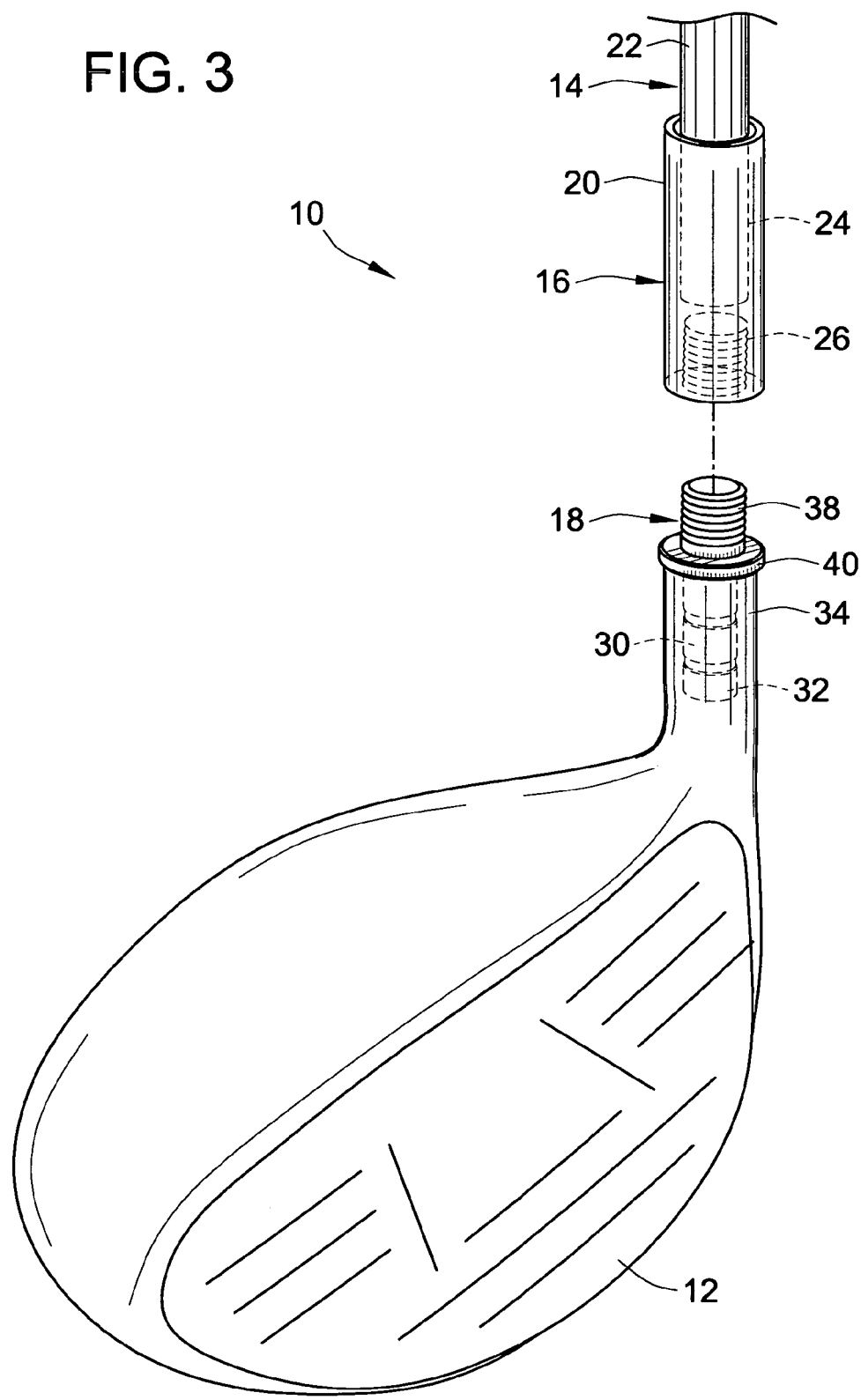
FIG. 3 is an exploded perspective view of the components of the connector of FIG. 1 being exploded and mounted to a golf club shaft and a golf club head respectively.
Figure 4:
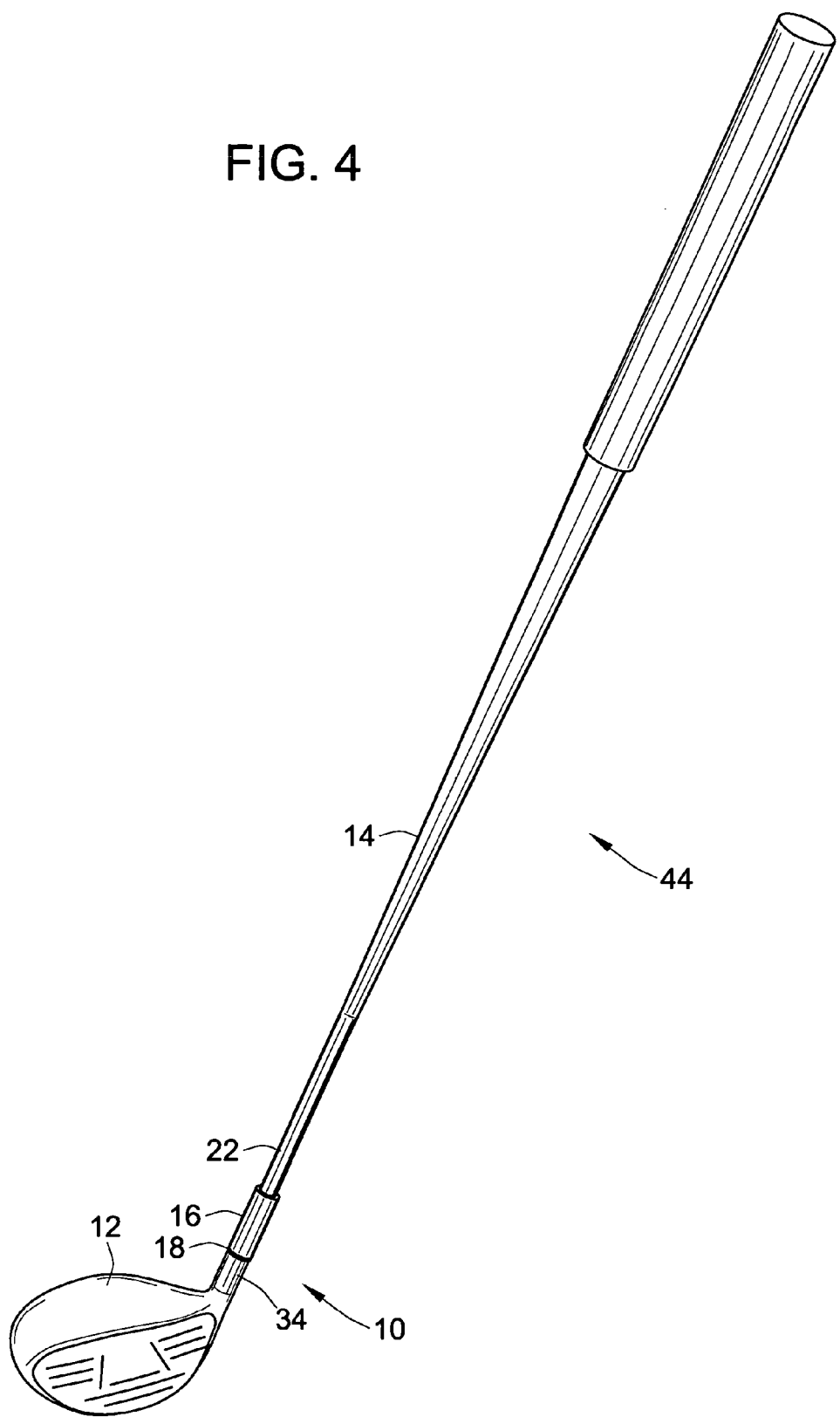
FIG. 4 is a perspective view of the connector of FIG. 1 as employed in an assembled golf club in accordance with an embodiment of the invention.

In employing the present invention it should be noted that the connector 10 increases the axial distance between the golf club head 12 and the golf club shaft 14 as shown or can be appreciated with reference to FIGS. 2–4 (as opposed to if the golf club shaft was inserted directly into the bore of the golf club head). Accordingly, there is a preferred method for employing the invention to create a customized golf club for a customer. According to this method the head mount 18 is dry fit on the golf club shaft 14 and the head mount 18 is dry fit on the golf club head 12. With the connector in threaded relation and full abutment, one can then measure how much of the tip end 22 of the golf club shaft 14 needs to be removed for a particular golfer (different people have different vertical heights). Because the tip end 22 of the shaft typically is of constant diameter (e.g. about the last 5" of the golf club shaft are typically of constant diameter and do not taper), there is the opportunity to trim or remove a portion of the shaft as schematically indicated by dotted line 42 in FIG. 2. Therefore, once the proper measurements are made with a dry fit with the connector 10 to determine proper shaft length, the tip end 22 of the golf club shaft 14 can then be trimmed 42 and thereby removed, and thus any increased distance between the golf club shaft 14 and the golf club head 12 by virtue of the connector 10 is eliminated. After the trimming operation, the shaft mount 16 is exploded onto the golf club shaft 14 and the head mount 18 is exploded into the golf club head 12 as shown in FIG. 3, again with full abutment occurring. Thereafter, the golf club head 12 and the golf club shaft 14 can be screwed together to connect the two components and form an assembled golf club 44 as shown in FIG. 4. If desired, the golf club head 12 and the golf club shaft can later be disconnected and either a different head or a different shaft can be employed thereby providing for interchangeability.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A connector for use in assembling a golf club having a golf club shaft and a golf club head including a sleeve portion, the connector comprising:

a shaft mount having a bore and a first interchangeable connector, the bore sized to mate with and secure the golf club shaft;

a head mount having a shaft and a second interchangeable connector, the shaft sized to mate with and secure the golf club head, the shaft separated from the second interchangeable connector by a stop flange, the stop flange extending radially outwardly relative to the shaft for abutting the sleeve portion of the golf club head;

first threads formed on the first interchangeable connector; and second threads formed on the second interchangeable connector, the first threads and the second threads threadably mateable to connect the shaft mount and the head mount together.

2. The connector of claim 1, wherein the first interchangeable connector and the second interchangeable connector are threadably mateable to prohibit both rotation of and axial displacement of the golf club head relative to the golf club shaft.

3. The connector of claim 1, wherein the first interchangeable connector and the second interchangeable connector are threadably mateable to prevent both rotation of and axial displacement of the golf club head relative to the golf club shaft.

4. The connector of claim 1, wherein a portion of the first interchangeable connector and a portion of the second interchangeable connector have a circular cross-section.

5. The connector of claim 4, wherein the first interchangeable connector and the second interchangeable connector are left-hand threaded when a right-handed golf club is assembled.

6. The connector of claim 4, wherein the first interchangeable connector and the second interchangeable connector are right-hand threaded when a left-handed golf club is assembled.

7. The connector of claim 1, wherein the shaft includes a groove, the groove having a shape consisting of radial, axial, and spiral with respect to the shaft.

8. The connector of claim 1, wherein at least a portion of the shaft is abraded.

9. The connector of claim 1, wherein the shaft mount further comprises a seating flange for use in locating the shaft mount relative to the golf club shaft.

10. The connector of claim 1, wherein the shaft is secured in the sleeve portion of the golf club head with an adhesive.

11. The connector of claim 1, wherein the shaft is secured in the sleeve portion of the golf club with only an adhesive.

12. The connector of claim 7, wherein the groove carries at least one of an epoxy and an adhesive for securing the head mount within the sleeve portion of the golf club head.

13. The connector of claim 1, wherein a golf club shaft outer diameter, a head mount outer diameter, a shaft mount inner diameter, and a sleeve portion inner diameter are all substantially equal to each other in size.

* * * * *